United States Patent [19]

Hales

[11] Patent Number: 4,552,993
[45] Date of Patent: Nov. 12, 1985

[54] TELEPHONE ACTIVATION APPARATUS

[76] Inventor: Paul D. Hales, P. O. Box 7573, High Point, N.C. 27264

[21] Appl. No.: 599,719

[22] Filed: Apr. 12, 1984

[51] Int. Cl.$^4$ ............................................. H04M 11/00
[52] U.S. Cl. ............................................................ 179/2 A
[58] Field of Search .......... 179/2 A, 2 AM, 6.07–6.11

[56] References Cited

U.S. PATENT DOCUMENTS 4,146,754  3/1979  Rose ................................. 179/2 A X
4,438,295  3/1984  Hales ................................. 179/2 A Primary Examiner—Gene Z. Rubinson
Assistant Examiner—W. J. Brady

[57] ABSTRACT

Telephone activation apparatus is presented which allows the user safety from inadvertent remote activation by providing the system with a telephone means which can be activated and subsequently called from a remote telephone during a limited time period to turn on in-home equipment and which can not be accessed by an accidental telephone call.

8 Claims, 3 Drawing Figures

TELEPHONE ACTIVATION APPARATUS

BACKGROUND OF THE INVENTION

1. Field Of The Invention

This invention relates to an improved remote activation apparatus and method whereby a first remote telephone is used to turn on a heating or cooling system in a home or other buildings from a distant location and is particularly concerned with the prevention of inadvertent or malicious interference by unauthorized persons. Safety is provided by requiring the activation of a second telephone within the home for a limited time period which can then be called whereby the second telephone starts the heating or cooling cycle. other telephones may be connected in a like manner.

2. Description of the Prior Art And Objectives of the Invention

Various prior art patents have demonstrated remote telephone activation apparatus such as that set forth in my earlier U.S. Pat. No. 4,438,295 whereby heating or cooling equipment can be turned on at a desired time from any location by using a telephone. However, inadvertent or malicious callers can on occasion trigger the heating or cooling equipment even with certain built-in safeguards much to the dismay of the homeowner.

Thus, a more precise and safer activation apparatus has been sought and one goal of the present invention is to prevent accidental or malicious remote activation of the designated equipment.

It is also an aim of the present invention to provide an apparatus and method which is relatively simple to use and which can be easily taught to others.

It is still another objective of the present invention to provide telephone activation apparatus which requires the simultaneous activation of two in-home telephones before the equipment can be turned on.

It is also an objective of the present invention to provide the second in-home telephone with a relatively short activation time cycle.

Other objectives and advantages of the invention will be readily apparent to those skilled in the art as set forth in the detailed descriptions below.

SUMMARY OF THE INVENTION

Telephone activation apparatus is provided to turn on equipment such as a home heating or cooling system from a remote location. The activation apparatus herein utilizes a remote telephone to call or communicate with a first telephone within for example, a home. The first in-home telephone after a sufficient number of rings activates a message recorder which may state that the homeowner is absent. Also, the recorder simultaneously activates a second in-home telephone which is in communication with equipment activation apparatus. The second in-home telephone is activated for only a limited time by the first recorder such as for 5–8 minutes as desired. During activation, the second in-home telephone can then be called from the remote location and a second recorder delivers a prescribed message while turning on the designated equipment such as an air conditioner or furnace. Thus, by requiring two remote calls to two in-home telephones each having its own telephone number, additional safety and security is assured while the chances of inadvertent activation are rendered almost non-existant.

DESCRIPTION OF THE PREFERRED EMBODIMENT

The preferred embodiment of the apparatus includes a remote telephone means from which a caller can dial a first in-home telephone which will be answered by a conventional telephone answering device such as sold by Radio Shack under the name "Realistic". The recording device will state to the caller for example that no one is home and will simultaneously activate a second in-home telephone for a short period of time, for example eight (8) minutes. The caller can then hang up the remote telephone and dial the second in-home telephone during the eight (8) minute time span which, upon allowing a sufficient number of "rings" will activate heating or other equipment located in the home. The method and apparatus as previously set forth in U.S. Pat. No. 4,438,295 does not as completely prevent inadvertent or malicious activation of the equipment, however, the present apparatus and method through its short activation of the second in-home telephone provides a safe and reliable method for turning on heating, air conditioner or other desired equipment.

The second in-home telephone can be equipped with a recorder which will tell the caller that the heating or other equipment is being turned on and other telephones can likewise be connected for addition equipment as needed.

OPERATION OF THE INVENTION AND DETAILED DESCRIPTION OF THE DRAWINGS

Figure 1:
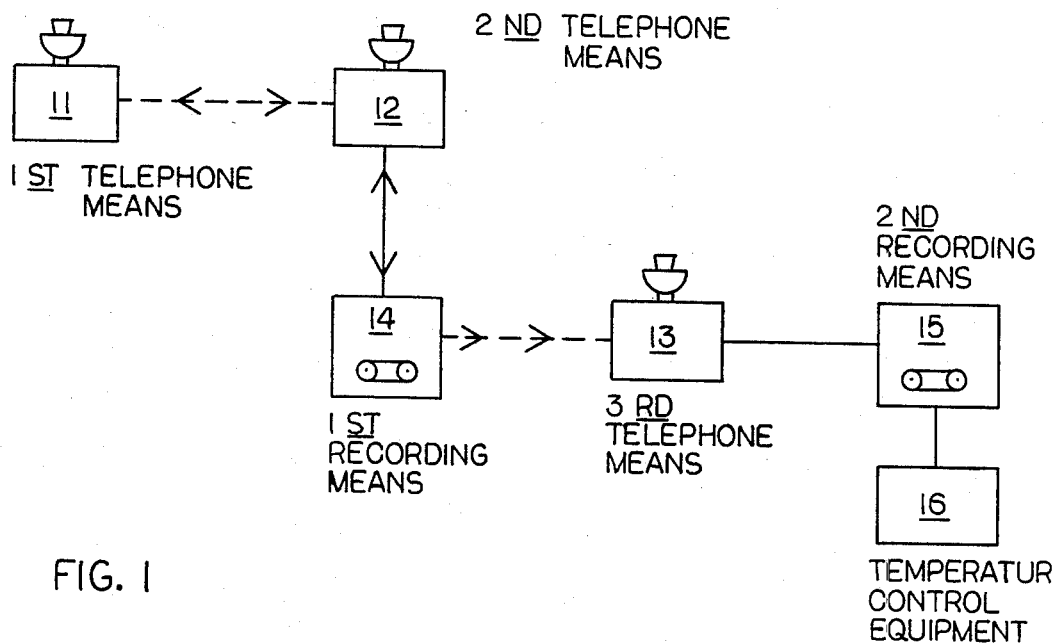
FIG. 1 demonstrates by the use of a block diagram the apparatus of the invention.

Turning now to the drawings, FIG. 1 demonstrates the first phase of the operation of the telephone activation apparatus 10 in which first remote telephone means 11 is in communication with second telephone means 12. Second telephone means 12 would be located in a home or other building. Third telephone means 13 as shown in FIG. 1 is also "in-home" and is activated for a short time cycle, for example eight (8) minutes by first recording means 14. The short time cycle can be modified for a longer period of time if desired. Third telephone means 13 during its activated time period will accept incoming telephone calls by the caller dialing the correct telephone number which is different from the number of the second telephone means 12. Connected to third telephone means 13 is second recording means 15 which, upon the appropriate number of telephone rings turns on temperature control equipment 16 such as a heating or air conditioning unit or other equipment as desired.

Figure 2:
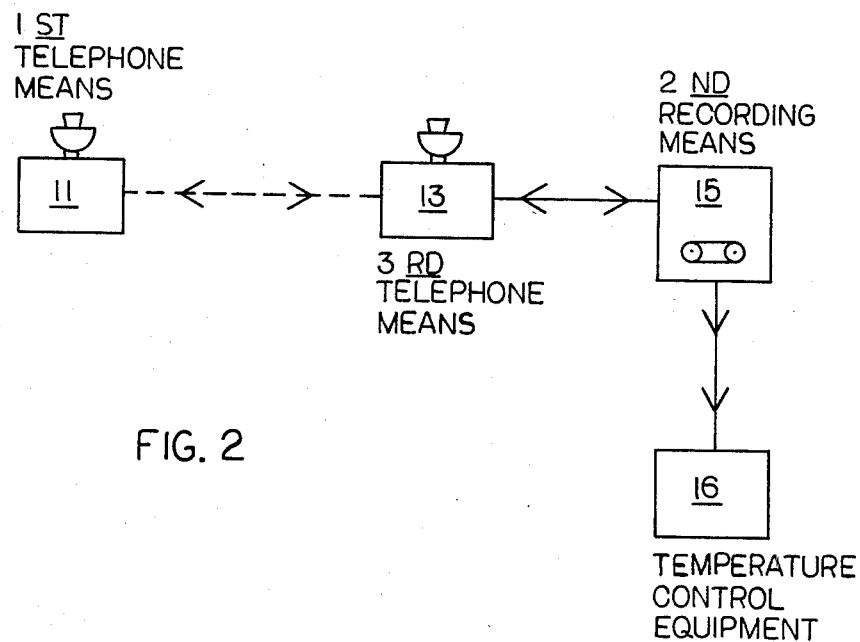
FIG. 2 showns a portion of the equipment as set forth in FIG. 1.

In FIG. 2, first remote telephone means 11 is shown in communication with third telephone means 13 as would occur during the eight (8) minute timing cycle provided by first recording means 14. During the second phase as shown in FIG. 2, temperature control equipment 16 is activated by a second recording means 15 which may be a "Realistic" or "Craig" telephone answering machine as conventionally known and a message may state to the caller that the temperature control equipment has now been activated.

Figure 3:
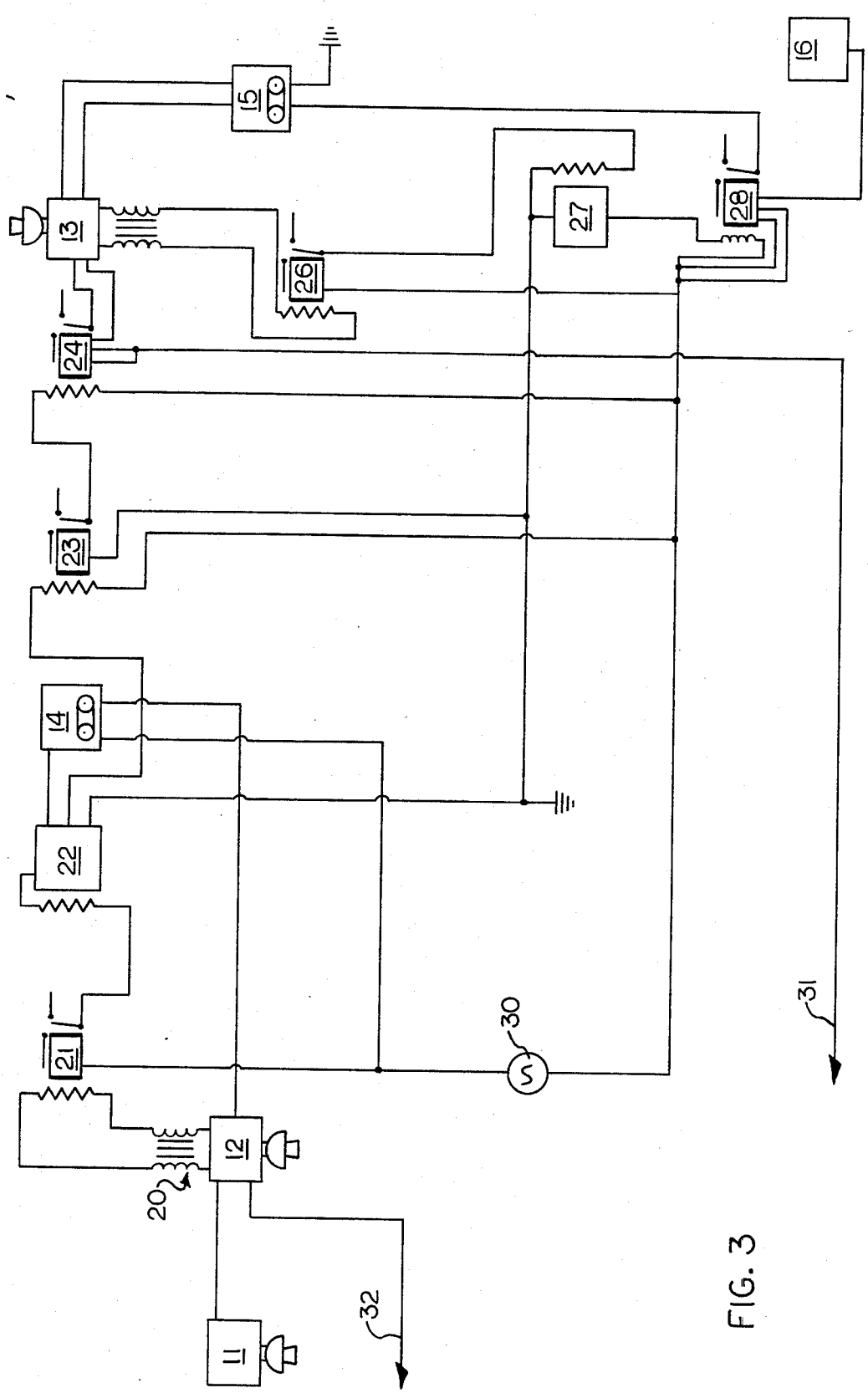
FIG. 3 demonstrates the detailed circuitry of the invention.

In FIG. 3, a more detailed description of the drawings are presented in which first telephone means 11 communicates with second telephone means 12. Telephone means 12 having telephone line 32 includes transformer 20 which delivers current to relay 21 which may be for example a five (5) volt DC relay. Relay 21 is joined to thermostat 22, which is for example a 100 ohm, 25 watt wire wound thermostat resistor which allows current to pass to first recording means 14 when sufficiently heated and to relay 23, a five (5) volt DC relay which in turn furnishes current to relay 24 joined to third telephone means 13 providing current so that telephone means 13 is activated. If a longer activation period for telephone means 13 is required then thermostat 22 may be sized by resistance (ohms) and wattage to have a longer cooling off period as activation of telephone means 13 is dependent upon thermostat 22 being sufficiently heated. Cooling can also be retarded by delaying the air flow around or to thermostat 22. Telephone means 13 is connected to telephone line 31 and includes telephone transformer 25 for providing energy to relay to 26, which is also a five (5) volt DC relay. Relay 26 delivers electrical current to thermostat 27 which may also be a 100 ohm, 25 watt wire wound thermostat resistor which in turn furnishes 110 volt AC current to relay 28 for providing 110 volt AC power to second recording means 15. AC supply source 30 is shown which provides 110 volt AC current. Relay 28 also provides electrical current to temperature control equipment 16 which may be for example an air conditioning unit.

The method of utilizing the invention as set forth herein consists of placing a telephone call from a remote telephone such as telephone means 11 in FIG. 3 whereupon telephone means 12, a first in-home telephone means rings and telephone transformer 20 then delivers an electrical current to relay means 21 which in turns activates thermostat 22 which provides electrical current to recording means 14. Recording means 14 communicates with remote telephone means 11 and simultaneously activates relay 23 which provides electrical current to second in-home telephone means 13. The first remote telephone means 11 is then hung up or disconnected with the caller realizing that second in-home telephone means 13 has only a short prescribed activation period, such as for eight (8) minutes. The caller, desiring to turn on equipment 16 then places a second telephone to telephone means 13 by dialing the correct telephone number within the eight (8) minute time span. Upon ringing, telephone means 13 then delivers electrical current to relay 26 which in turns activates thermostat 27 thus providing current to relay 28 allowing second recording means 15 to be activated. Second recording means 15 furnishes power to equipment 16 which may be for example an in-home heating system.

Various modifications or changes can be made to the electrical circuitry as shown and described herein and the illustrations as presented are merely for explanatory purposes and not intended to limit the scope of the invention.

I claim:

1. Telephone activation apparatus comprising: a first remote telephone means, a second telephone means, said remote telephone means for first communicating with said second telephone means, third telephone means, recording means, said recording means in communication with said second and said third telephone means for activating said third telephone means upon communication from said remote telephone means to said second telephone means, said third telephone means upon activation by said recording means being communicable with said remote telephone means, said third telephone means for activating equipment upon communication from said remote telephone means whereby said remote telephone means by secondly communicating with said third telephone means can thereby activate equipment from a remote location.

2. Telephone activation apparatus as claimed in claim 1 wherein said third telephone means is connected to temperature control equipment.

3. Telephone activation apparatus as claimed in claim 1 wherein said recording means includes timing circuitry to control the length of activation of said third telephone means.

4. Telephone activation apparatus as claimed in claim 1 wherein said third telephone means is connected to a second recording means.

5. Telephone activation apparatus comprising: a first remote telephone means, a second telephone means, said remote telephone means for first communicating with said second telephone means, a third telephone means, said third telephone means connected to controlled apparatus, said third telephone means in communication with said second telephone means, first recording means, first recording means in communication with and for activating said third telephone means upon communication from said remote telephone means to said second telephone means, said first recording means connected to said second telephone means, said first recording means including timing circuitry, said timing circuitry for controlling the length of activation of said third telephone means, and second recording means, said third telephone means upon activation by said first recording means communicable with said remote telephone means, said second recording means connected to said third telephone means, said second recording means for activating controlled apparatus upon communication from said remote telephone means to said third telephone means whereby said remote telephone means can secondly communicate with said third telephone means and said third telephone means will thereafter activate said second recording means which will in turn activate controlled apparatus connected thereto.

6. A method of activating an apparatus by a remote telephone comprising the steps of: firstly communicating with a second telephone with a first remote telephone, activating a recording means joined to said second telephone, activating a third telephone by the recording means, and thereafter secondly communicating with the third telephone by the first remote telephone to thereby activate apparatus connected to said third telephone.

7. A method of activating an apparatus by telephone as claimed in claim 6 wherein the step of activating said third telephone comprises activating said third telephone for a selected time period.

8. A method of activating an apparatus as claimed in claim 6 wherein the step of communicating with said third telephone comprises dialing a first remote telephone to communicate with said third telephone.

* * * * *